United States Patent
Corwin et al.

(10) Patent No.: US 9,682,674 B2
(45) Date of Patent: Jun. 20, 2017

(54) PULTRUDED BEAM, AND APPARATUS AND METHODS FOR MANUFACTURING

(71) Applicant: Shape Corp., Grand Haven, MI (US)

(72) Inventors: Cort C. Corwin, Grand Haven, MI (US); Toby K. Jacobson, West Olive, MI (US); Joseph R. Matecki, Allendale, MI (US); Ed C. Pendergrass, West Olive, MI (US)

(73) Assignee: Shape Corp., Grand Haven, MI (US)

( * ) Notice: Subject to any disclaimer, the term of this patent is extended or adjusted under 35 U.S.C. 154(b) by 0 days.

(21) Appl. No.: 14/956,518

(22) Filed: Dec. 2, 2015

(65) Prior Publication Data

US 2016/0167609 A1     Jun. 16, 2016

Related U.S. Application Data

(60) Provisional application No. 62/090,524, filed on Dec. 11, 2014.

(51) Int. Cl.
| | |
|---|---|
| *B60R 19/03* | (2006.01) |
| *B60R 19/12* | (2006.01) |
| *B60R 19/18* | (2006.01) |
| *B60R 19/24* | (2006.01) |
| *B29C 70/52* | (2006.01) |
| *B29L 31/30* | (2006.01) |
| *B29K 105/08* | (2006.01) |

(52) U.S. Cl.
CPC ............ *B60R 19/03* (2013.01); *B29C 70/523* (2013.01); *B29C 70/525* (2013.01); *B60R 19/12* (2013.01); *B60R 19/18* (2013.01); *B60R 19/24* (2013.01); *B29K 2105/0809* (2013.01); *B29L 2031/3044* (2013.01); *B60R 2019/1853* (2013.01)

(58) Field of Classification Search
CPC ......... B60R 19/02; B60R 19/03; B60R 19/12; B60R 19/18
USPC .................................... 293/120, 122
See application file for complete search history.

(56) References Cited

U.S. PATENT DOCUMENTS

| | | | |
|---|---|---|---|
| 4,445,957 A | 5/1984 | Harvey | |
| 5,290,079 A * | 3/1994 | Syamal | .................. B29C 70/48 264/257 |

(Continued)

FOREIGN PATENT DOCUMENTS

| | | |
|---|---|---|
| DE | 2461706 A1 | 7/1975 |
| DE | 4208670 A1 | 9/1993 |

(Continued)

OTHER PUBLICATIONS

International Search Report and Written Opinion of the International Searching Authority dated Dec. 7, 2015 (International Application No. PCT/US2015/064262) 10 pages.

*Primary Examiner* — Jason S Daniels
(74) *Attorney, Agent, or Firm* — Price Heneveld LLP (57) ABSTRACT

The present bumper impact beam includes pultruding polymer (e.g. thermoset polymer, preferably polyurethane) into continuous reinforcement (preferably carbon fibers or glass fibers), the reinforcement including fabrics selectively positioned and extending around corners for improved impact strength. The beam preferably has a 50%-70% fiber volume fraction that is relatively uniform throughout the part. A curved cooling support and/or beam design may be used to cause the cooled beam to have a sweep.

36 Claims, 7 Drawing Sheets

(56) References Cited

U.S. PATENT DOCUMENTS

| | | | |
|---|---|---|---|
| 8,066,922 B2 | 11/2011 | Jansen et al. | |
| 8,562,041 B2 * | 10/2013 | Kinefuchi | B60R 19/03 292/120 |
| 2015/0129116 A1 * | 5/2015 | Richeton | B60R 19/03 156/180 |
| 2016/0121827 A1 * | 5/2016 | Yabu | B60R 19/03 293/120 |
| 2016/0159300 A1 * | 6/2016 | Matecki | B23P 15/00 293/120 |

FOREIGN PATENT DOCUMENTS

| | | |
|---|---|---|
| DE | 102011015160 A1 | 9/2012 |
| EP | 2139670 A1 | 1/2010 |
| WO | 2008116560 A1 | 10/2008 |

* cited by examiner

FIG. 9

PULTRUDED BEAM, AND APPARATUS AND METHODS FOR MANUFACTURING

CROSS-REFERENCE TO RELATED APPLICATION

This application claims benefit under 35 USC section 119(e) of U.S. Provisional Patent Application Ser. No. 62/090,524 entitled PULTRUDED BEAM, AND APPARATUS AND METHODS FOR MANUFACTURING, filed Dec. 11, 2014, the entire contents of which are incorporated herein by reference.

BACKGROUND OF THE INVENTION

The present invention relates to impact beams made of pultruded reinforced polymeric material, and more particularly relates to a pultruded beam having a significant percentage of long continuous fiber reinforcement and that is optimized for impact, adapting it for use as vehicle bumper impact beams. The present invention also relates to apparatus and methods for making same. However, the present invention is not believed to be limited to only bumper impact beams, but instead is believed to extend to other impact beams and other products where properties are important such as bending strength, tensile strength, impact strength, strength to weight ratio, and/or attachment.

Modern vehicles include bumper beams designed for impact strength, but are also designed for designed low weight, high strength to weight ratio, front end aesthetics, optimal energy absorption, occupant safety, pedestrian injury reduction, flexible design in styling, and many other factors. Notably, weight significantly affects vehicle mileage, especially given a bumper beam's size and its position in front of the vehicle tires. Original equipment manufacturers (i.e. vehicle "OEMs") continue to desire a next level in performance improvement and cost/mass optimization. For example, some vehicle OEMs have specified bumper beams made by aluminum extrusion, doing so despite a cost penalty for material, despite a loss of some material strength properties, and despite functional and physical limitations of aluminum extruding processes and extruded components.

Pultruded components incorporate a high density of very-long or continuous reinforcement fibers in a polymeric part, such as 40-50% reinforcement or more. However, known pultruding processes and pultruded polymeric parts have not been accepted by OEMs for making bumper impact beams for several reasons. For example, pultruded materials can exhibit unacceptable characteristics on impact, such as premature catastrophic failure, (e.g. failure by fast-propagating longitudinally-extending cracks along lines defined by reinforcement fibers and polymeric material flow lines), low total energy absorption and low maximum energy absorption prior fracture, and generally unacceptable force-deflection profiles. Also, it is noted that pultrusion processes tend to be relatively slow, parts can be process sensitive, and the processes are not generally widely known nor widely used. Also, pultruded components require careful secondary treatment with care being necessary to avoid significant loss of properties due to breaking of imbedded fibers and/or creation of stress-risers when creating beam attachment sites. Also, distribution of fibers and their exact location and orientation can be difficult to control. Also, it is difficult to sweep (i.e. longitudinally curve) an elongated pultruded part. Still further, impact properties at corners and at other locations of "natural" stress risers can be problematic.

SUMMARY OF THE INVENTION

In one aspect of the present invention, a vehicle bumper system comprises an impact beam including polymeric material and at least 30% by volume of longitudinally-extending continuous fiber reinforcement embedded in the polymeric material, with at least some of the reinforcement extending a length of the beam; and attachment structure on ends of the beam for mounting the beam to a vehicle's frame rails.

In another aspect of the present invention, a beam adapted for impact comprises an elongated impact beam including at least 40% polymeric material and at least 40% continuous reinforcement extending a length of the beam, the beam including walls defining a closed section; and attachment structure on ends of the beam for mounting the beam to a vehicle's frame.

In another aspect of the present invention, a bumper impact beam comprises a beam including at least polymeric material and at least 40% reinforcement; the reinforcement including tows, rovings and fabrics of fibers, the beam including a cross section with walls defining a corner, with at least one of the fabrics extending around the corner.

In another aspect of the present invention, a bumper impact beam comprises a beam made of polymeric material and reinforcement and including walls defining a cross section having a width (W) and height (H); the reinforcement includes at least one first fabric having a first width greater than W but less than H, and at least one second fabric having a second width about equal to H.

In another aspect of the present invention, a bumper impact beam comprises a beam made of polymeric material and reinforcement and, when in a vehicle-mounted position, including front, rear, top and bottom walls defining a cross section having a width (W) and height (H); the reinforcement including at least one fabric that extends fully across the front wall and onto the top and bottom walls.

In another aspect of the present invention, a bumper impact beam comprises a beam made of polymeric material and elongated reinforcement extending a length of the beam, the beam when in a vehicle-mounted position including front, rear, top, and bottom walls forming a closed section with corners, and at least one internal wall extending between the front and rear walls; the reinforcement including at least one fabric in each wall that extends a full width of each wall and that extends partially onto an adjacent one of the walls.

In another aspect of the present invention, a process comprises pultruding a continuous beam by pulling reinforcement through a pultrusion die while injecting pultrusion polymer into the die, the reinforcement including at least some fabrics extending around corners formed by joined walls in the beam; cutting the continuous beam into bumper impact beams having a length sufficient to extend across a vehicle between vehicle frame rails; and forming attachment structure on ends of the beam including a pattern of holes for receiving bumper attachment fasteners.

In another aspect of the present invention, a process comprises steps of: pultruding a continuous bumper impact beam including injecting a polymer into elongated reinforcement made from continuous fibers, the beam being elongated along a longitudinal direction; and forming the beam to a non-linear shape prior to the polymer setting up into a permanent set shape.

These and other aspects, objects, and features of the present invention will be understood and appreciated by those skilled in the art upon studying the following specification, claims, and appended drawings.

DETAILED DESCRIPTION OF PREFERRED EMBODIMENT

Figure 1:
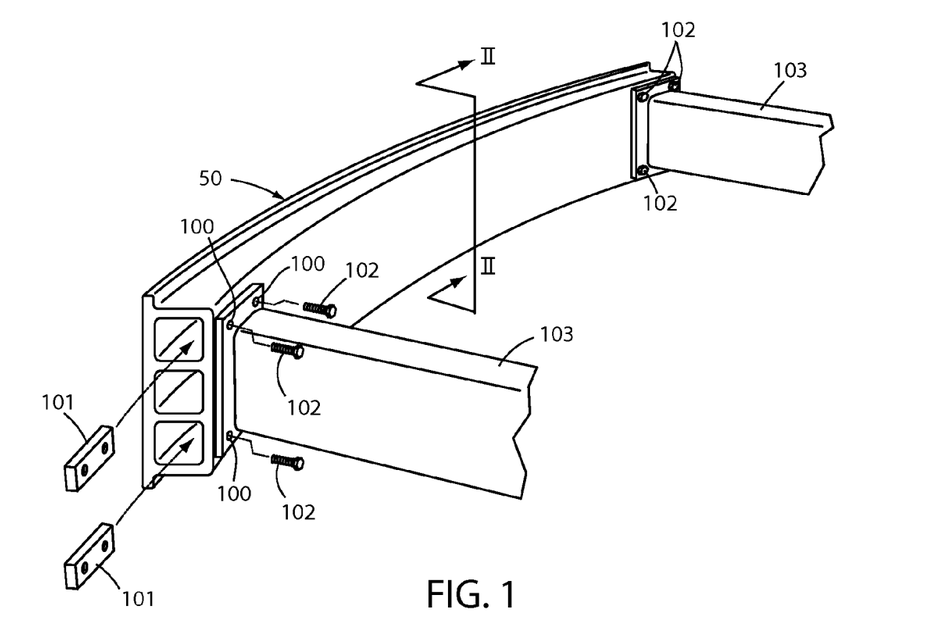
FIG. 1 is a perspective view of a pultruded bumper beam mounted to vehicle frame rails.
Figure 2:
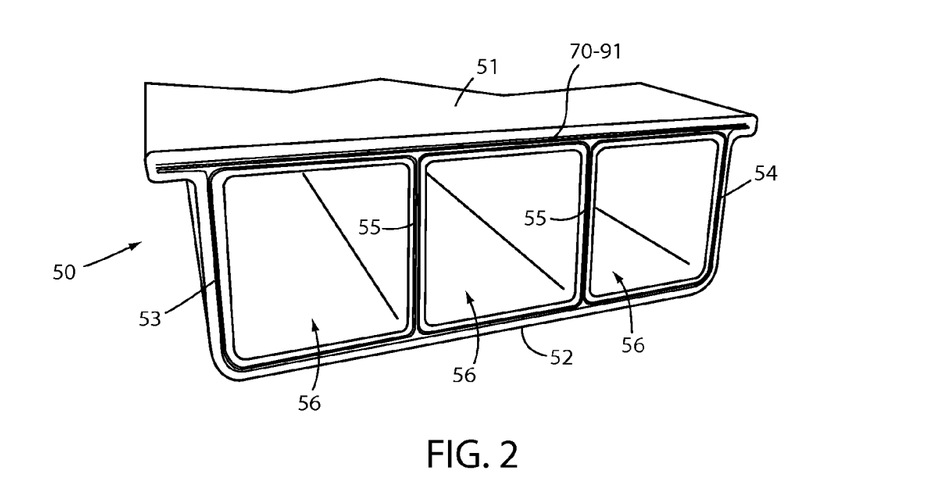
FIG. 2 is a cross section taken transversely through the pultruded beam of FIG. 1.

The present bumper impact beam 50 (FIGS. 1-2) comprises a pultruded polymeric material with a high density of continuous reinforcements 70-91, with a majority of the fibers extending a length of the beam. The reinforcements 70-91 are fibers arranged in various configurations, locations, and orientations, such as by using fabrics, tows, rovings, and bundles to achieve desired fiber volume densities, bending and strength properties, and crack-resisting properties. The illustrated pultruded beam optimally includes a uniform distribution and density of reinforcement, including at least about 30% fiber volume fraction (FVF) (i.e. volume of elongated reinforcement fibers divided by total area of fibers and polymer), or more preferably about 40% to 80% FVF, and most preferably at least about 50% to 70% FVF.

As used herein, the word "reinforcement" is intended to broadly include length-extending reinforcing fibers of all types, such as individual fibers, twisted bundles, fabrics, tows, rovings, and/or other arrangements. The word "fabric" includes fibers stitched or woven or otherwise secured together to form a "sheet" or mat of fibers. It is noted that the fiber volume fraction (FVF) can be varied at different locations within a pultruded part for optimal performance, such as by placing more or less fibers at and/or extending around corners and along walls where more (or less) stress may occur or where there stress needs to be well distributed. The reinforcements are pre-positioned by a guide as they enter an injection die (also called "pultrusion die"), thus placing them at strategic locations in the pultruded beam 50, as discussed below.

The beam 50 (FIG. 1) includes attachment structure at ends of the beam, such as holes 100 for attaching the beam 50 to a vehicle frame. It is contemplated that a variety of different attachment structures could be provided. The illustrated attachment structure includes plate brackets 101 placed into (or extended into or otherwise attached or adhered to) ends of the beam 50, with threaded holes in the brackets 101 lining up with holes 100 in the beam. The plate brackets 101 help distribute stress, and can carry tack-welded nuts for engaging retainer bolts 102 that extend through holes 100 into the plate brackets and nuts in order to attach the beam 50 to a vehicle's frame rails 103.

As noted above, the term "reinforcement" broadly includes a number of different reinforcement and fiber types and arrangements, such as fiber tows/rovings, braided fibers, fiber fabrics (including woven-flat, woven-3D, fabric with core, tailored fabric, stitched fabric, hybrid fabric with unique arrangement or combination of fiber fabrics), and other fiber arrangements (such as intermittently placed fabric sections placed along and/or in the beam to optimize impact properties). To optimize corner strength and impact properties, the illustrated beam 50 includes at least one roving where the fibers extend primarily longitudinally and continuously a length of the beam 50 and at least one fabric that extends around a corner in the beam's cross section. Also, a preferred beam 50 includes at least one fabric where the fibers include angled fibers extending at 45 degrees (or other degrees) and/or with bi-axially extending fibers, which assists with stress distribution on impact.

The illustrated pultruded bumper impact beam 50 (FIGS. 1-2) when in a vehicle-mounted condition includes front, rear, top, bottom, and intermediate walls 51-55, respectively, (FIG. 2) defining a closed section with three longitudinal cavities. The beam could include more or less cavities and walls, depending on performance requirements. The illustrated preferred beam 50 includes a variety of reinforcements 70-90, each having various widths and shapes as illustrated. The reinforcements may include fibers 91 positioned at strategic locations around the profile, such as at corners. For example, reinforcement fabrics 73, 89, and 90 extend along walls 52, 53, 54 and slightly onto the ends of front wall 51. Fabrics 71, 79, 80, 81 82, 72 extend a width of but only across front wall 51. Fabric 70 extends only a width of intermediate wall 55. Fabrics 86, 76, 70 double back on themselves, but only extend a length of intermediate wall 55. Fabric 78 extends across intermediate wall 55 and partially onto front wall 51 and partially onto rear wall 52. Fabric 74 extends across rear wall 52, up top and bottom walls 53 and 54, and (inwardly) partially onto front wall 51.

The beam 50 (FIGS. 1-2) has a continuous cross sectional shape (i.e. with a constant depth-width W from front to rear walls 51-52, and with a constant height H from top to bottom walls 53-54). Alternatively, it is contemplated that the beam could be non-uniform in its width W or height H along its length. This can be done by providing a movable part in the injection die or in a downstream profile die. Also, the beam can have wall thicknesses that vary along its length. In a preferred form, the bumper impact beam 50 comprises a cross section with generally planar walls defining perpendicular corners, where some walls extend parallel a fore-aft direction of the vehicle to form what is often called "shear walls" in the art. In such case, corners formed by a shear wall with another wall will preferably have at least one fabric of reinforcement extending around each such corner for stress distribution, in order to better distribute stress when the beam undergoes an impact or load. In a more preferred form, the reinforcement includes at least two different fabrics, each with differently-oriented fibers and each strategically placed for optimal beam properties. The fibers may be of a same material (such as carbon fiber), or could be a combination of different materials (such as carbon fiber and fiberglass).

Figure 3:
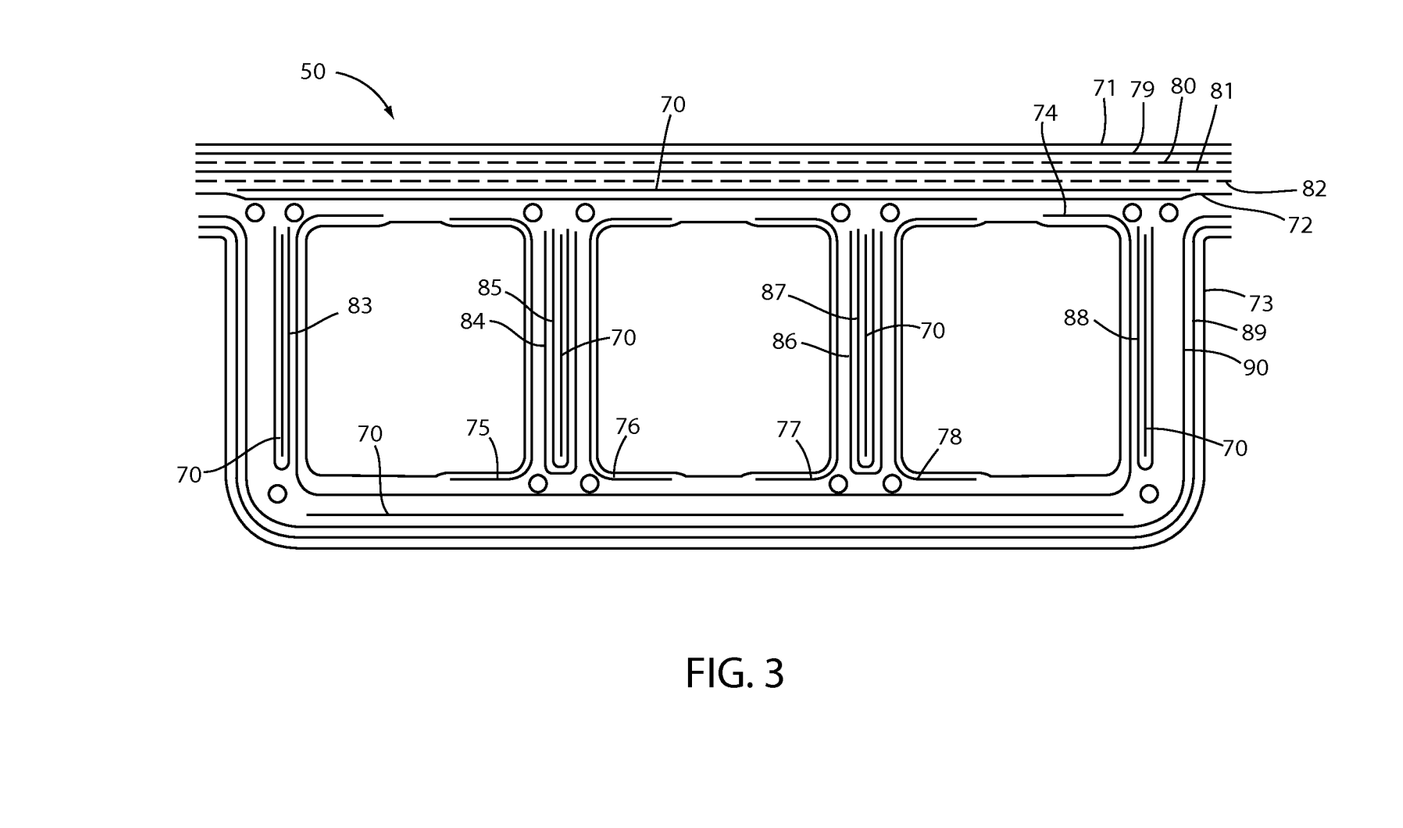
FIG. 3 is a cross section like FIG. 2, but with reinforcement fibers exploded slightly apart to show a position and width of various fibers, fabrics, rovings and tows.
Figure 4:
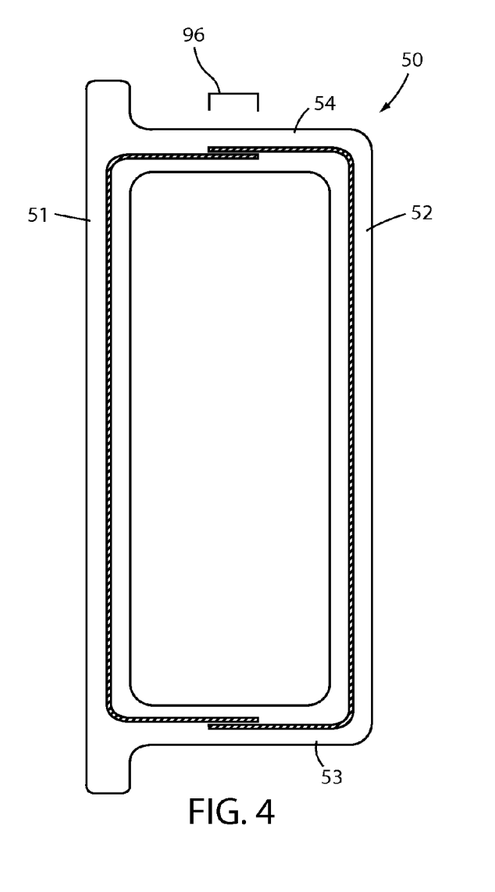
FIGS. 4 and 4A are cross sections like FIG. 2, but showing different overlap conditions of fabrics that extend onto top and bottom walls, FIG. 4 showing a small overlap and FIG. 4A showing a large overlap.
Figure 4A:
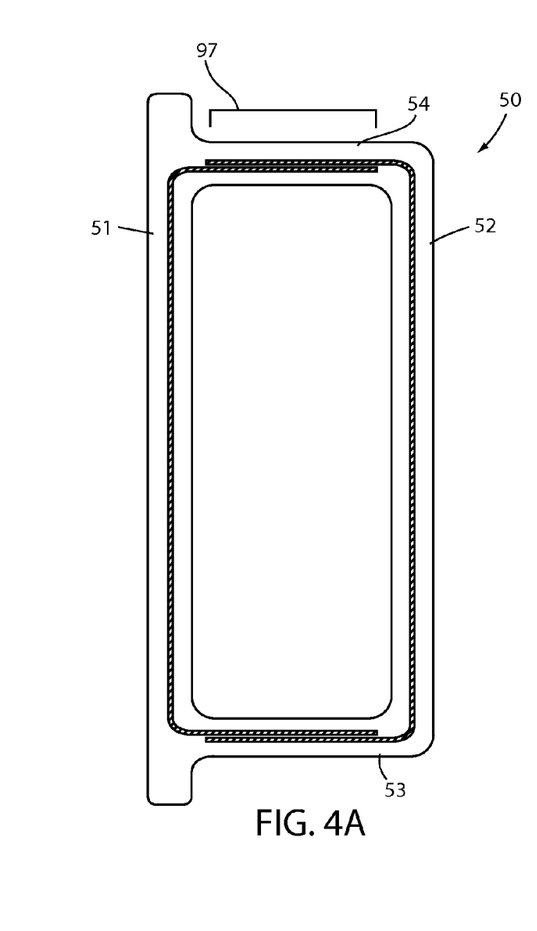
Figure 7:
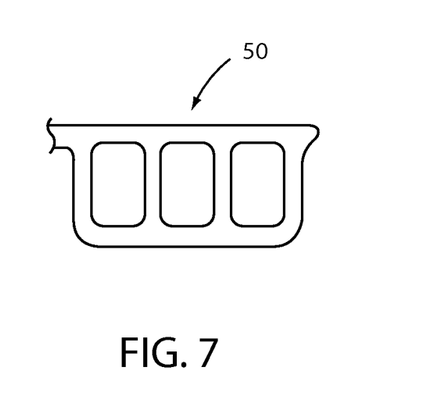
FIGS. 7-7A are partial cross sectional views of a beam's corner where walls join at 90 degrees, FIG. 7 showing a majority of the beam, FIG. 7A being an enlarged view of the corner to thus better show wall thicknesses at the corner.
Figure 7A:
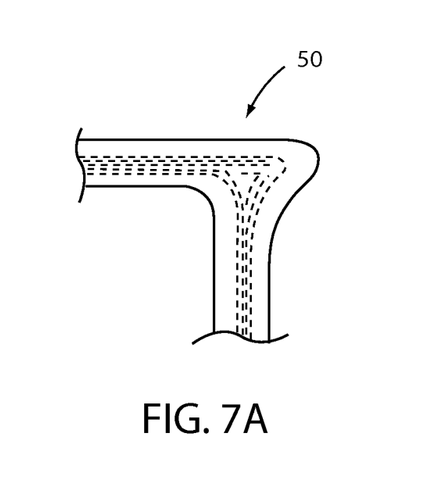

In a preferred form, the beam with reinforcements (FIG. 3) is particularly designed to control ("manage") stress, such as by reducing the number or severity of stress risers, and by having attributes that distribute stress in places where high stress is likely. For example, stress control is done in part by beam design, including wall structure (where different walls may be different thicknesses, non-constant thickness, or include reinforcing patches that extend only a short distance, such as at attachment sites), and corner shapes. This can also be done by the location and width of various fabrics, and by the overall types and arrangements of reinforcements (see FIG. 2). It can also be done by the amount of edge overlap of fabrics. In FIG. 4, two fabrics are shown forming a minimal/short overlap 96 (such as ½ inch or so) at both of the top and bottom walls 53, 54. In FIG. 4A, two fabrics are shown forming a long overlap 97 (such as 1½ to 2 inches or so, depending on beam size) on both the top and bottom walls 53, 54. The distribution of stress can also be helped by varying wall thickness. See FIGS. 7 and 7A where walls 51 and 53 form a perpendicular corner, with the wall 53 having a greater wall thickness dimension D1 near the corner and a thinner dimension D2 away from the corner. For example, dimension D1 can be ⅜ inch or more, and dimension D2 can be ¼ inch or less.

In one form, the present innovative beam (FIG. 1-2) comprises pultrudable polymeric material such as a two-part thermoset polyurethane with embedded carbon reinforcement fibers. Two-part thermoset polyurethane materials and carbon fiber reinforcements are known and commercially available, such that persons skilled in this art will understand and can obtain these products. Notably, two-part thermoset pulyrethane has a low viscosity prior to chemical reaction and set up, and has good wet-out characteristics and reinforcement adhesion characteristics. The illustrated beam 50 of two-part thermoset polyurethane with embedded carbon fibers preferably includes walls defining a cross section having a width (W) (i.e. when viewed from above when in a vehicle-mounted position) and height (H) (i.e. vertical direction in front view). In one aspect of the present invention, the reinforcement (FIG. 3) includes at least one fabric with a first width greater than beam width W but less than beam height H, and at least one second fabric having a second width greater than H.

Similarly, in another most preferred form, the beam 50 (FIG. 1-2) includes polymeric material and full-length elongated reinforcement; with the beam when in a vehicle-mounted position including a front wall, a rear wall, a top wall, a bottom wall, and at least one internal wall extending between the front and rear walls. The reinforcement includes at least one first fabric extending at least a full height of the front wall, at least one second fabric extending at least across the top, rear, and bottom walls, and at least one third fabric extending at least a width of the at least one internal wall. (See FIGS. 3, 4, and 4A.) By extending one or more fabrics fully across some walls and around a corner(s) onto other walls, an impact strength of the beam is greatly enhanced.

The pultrusion processes (apparatus 149) (FIG. 5) for forming the present beam includes a rack 150 that holds rolls of continuous reinforcements 70-91. The reinforcements 70-91 are fed through preforming guides 151 (which can also double as cloth racks 151A) into material guides 152 and 154, which gives them specific locations and orientations. A preheater 153 can be used to warm the reinforcements at or downstream of the guide 152 (and/or guide 154) to assist in optimal uniform coating and adhesion of polymer to the reinforcements when passing into and through the pultrusion die 155. The reinforcements 70-91 extend from the guide 154 into the pultrusion die 155 (also called an "injection die") where polymer (also called "resin") is delivered from a resin supply tank 156. The polymer is pumped under pressure from the resin supply tank 156 into the pultrusion die 155 with sufficient pressure and rate to fully wet and coat all reinforcements 70-91, with the rate and pressure and reinforcement speed being sufficient to achieve a desired fiber volume fraction and desired uniformity of reinforcement density throughout the beam. The injection die 155 is heated (e.g. heater 153A) and optionally is vibrated if necessary to assure full coating of all reinforcement and to assure proper reaction of the two-part resin. A pulling mechanism 158 includes one or more sets of grippers/clamps 159 and hydraulic rams 160 (also called "pultrusion-carrying carts") that cooperate to support the pultruded continuous beam 162 as the beam is pulled from (extends from) the injection die 155. The pulling mechanism 158 provides pulling forces that pull the pultrusion out of the pultrusion die 155, doing so while relying mostly on a strength of the reinforcement (since the polymer is not yet fully cured) and doing so with sufficient force to cause the pultrusion process to operate effectively. Of course, the pulling mechanism 158 pulls with a force that is sufficiently limited so that it does not undesirably stretch and elongate or distort the continuous pultruded beam 162. The pultruded beam 162 continues away from the pultrusion die 155 onto a cooling station 163. Once the beam 162 is sufficiently cooled to maintain its shape, a cutoff device such as cut-off saw 164 cuts the continuous pultruded beam 162 into beams 50 of desired length.

Figure 8:
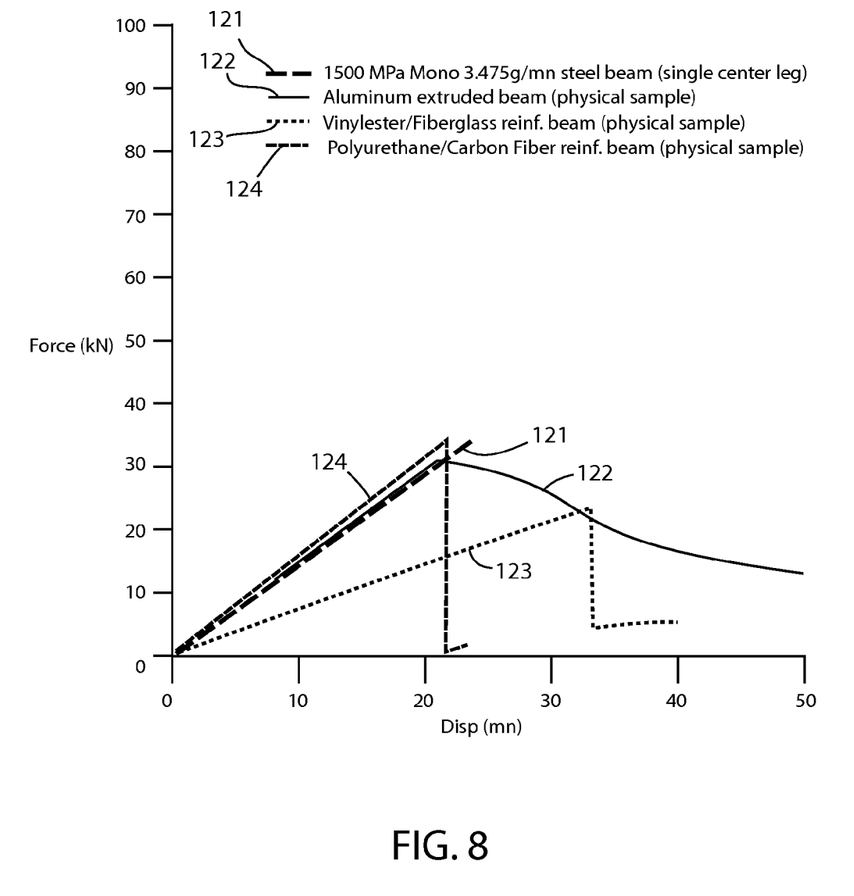
FIG. 8 is a graph comparing force-displacement curves for several beams, including a baseline roll formed steel beam, a baseline extruded aluminum beam, a (vinylester/fiberglass) $1^{st}$ reinforced polymeric beam, and a (polyurethane/carbon fiber) $2^{nd}$ reinforced polymeric beam.

FIG. 8 is a graph of a force versus deflection curves for various beams of similar cross section, including FD lines 121-124. It shows that a pultruded reinforced polymeric beam (line 124) made using carbon fiber reinforcement and two-part polyurethane polymer can provide a similar strength to the force-displacement curve of an extruded aluminum beam (line 122) and can provide a similar strength to the displacement curve of a steel roll formed monoleg beam (line 121). This is a surprising and unexpected result. Another pultruded test beam of similar cross sectional size was made using vinylester polymer resin and fiberglass reinforcement (line 123). It provided a lower force-deflection curve see line 123), but nonetheless it is noted that it could be successfully used in some bumper applications and some beam applications. Also, some success has been achieved using a combination reinforcement of carbon fiber and fiberglass. As will be understood by persons skilled in the art, by using a combination of reinforcement types, a hybrid beam can be tailor-made to have a desired set of force-deflection characteristics required, while also optimizing cost, weight, strength-to-weight, and other characteristics of the hybrid beam.

Figure 6:
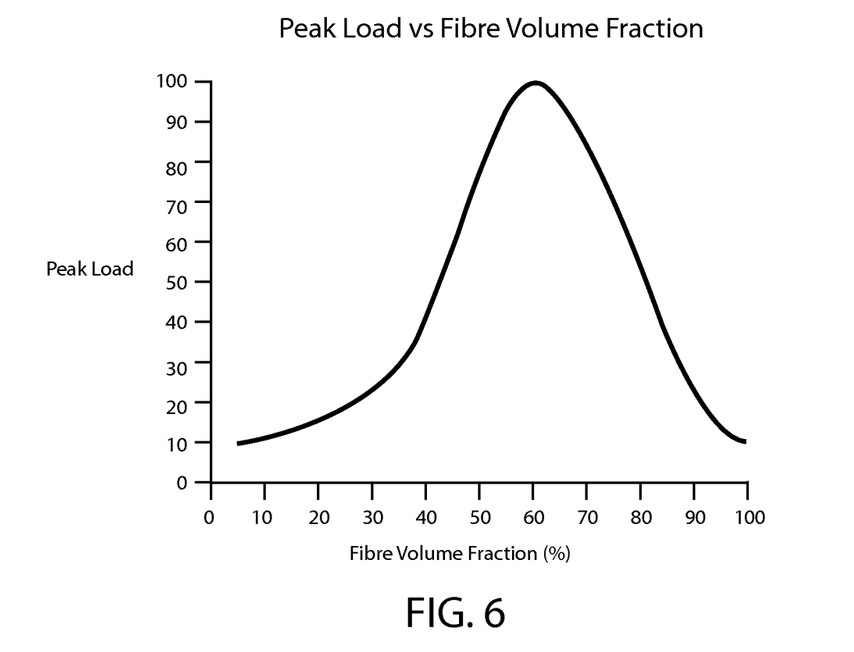
FIG. 6 is a graph showing peak load versus fiber volume fraction, showing that max load capability occurs at about 55%-60% fiber volume fraction, and a 75% load capability occurs at about 50%-70% fiber volume fraction, and a 50% load capability occurs at about 40%-80%.

In a preferred form, the present pultruded beam is made of about 50% (or less) thermoset polyurethane polymeric material, and about 50% (or more) continuous carbon-fiber bundled fabrics/fibers 70-90, and provides a fiber volume fraction (FVF) of about 50%-70% at least in strategic locations for optimal beam strength. This FVF provides sufficient polymeric material to bind the fibers for optimal strength, while maintaining an optimally high percentage of fibers. As illustrated by the F-D graph in FIG. 6, an "overly high" percentage of fibers will cause the polymeric material to be insufficient for good bonding. Contrastingly, an "overly low" percentage of fibers will result in a lower beam strength approaching that of the polymeric material. In the present innovative beam, a plurality of different discrete bundles and mats are strategically placed for optimal impact and strength properties. The graph of FIG. 6 shows a distribution of load capability versus fiber volume fraction, showing that max load capability occurs at about 55%-60% fiber volume fraction, and a 75% load capability occurs between about 50%-70% fiber volume fraction, and a 50% load capability occurs between about 40%-80% fiber volume fraction.

As noted above, it is contemplated that different polymeric and reinforcement fibers can be used depending on a particular beam's functional design requirements. For example, it is contemplated that other fibers can be used instead of carbon fibers, such as aramid, basalt, or glass fibers. Also, there are different grades and diametrical sizes of fibers (carbon and others). Also, different woven mats and different mat locations will produce different beam properties. It is contemplated that many different thermoset (or thermoplastic) materials can be use besides polyurethane. The present polyurethane is a two-part fast-curing polymer that will cure to a self-holding shape in about 5-30 seconds, though slower curing polymers can be used for optimization of the pultrusion process, such as if the pultrusion process is slowed for control reasons. It is contemplated that the reinforcement can include different types of materials, such as glass fibers in one location and carbon fibers in other (or similar) locations.

Notably, the present beam incorporates fabrics having fibers woven to extend at angles to a longitudinal direction. For example, fabrics can have fibers extending at an angle to a longitudinal direction, such as at 45 or 90 degrees. This provides significant strength and stress distribution by providing a structural mechanism for handling non-longitudinal stress and loads often encountered by bumper impact beams. For example, the angled fibers provide improved beam strength, and also reduce a speed and tendency of longitudinal crack propagation upon failure. Also, where fabrics and/or angled fibers extend across corners and joined walls, the angled fibers transmit stress away from the corners and joined walls. Also, fabrics can be used in high-stress areas having fibers that are better adapted for the expected stress at that location, such as at attachment sites. Also, particularly woven and bundle combinations and stitches can be selectively positioned in the pultrusion. By selectively using fabrics, additional strength and localized region-specific load resistance can be provided in selected areas of a beam. Concurrently, areas of lower stress can be "adjusted" to minimize cost and weight, while optimizing overall the pultrusion process.

The present pultruded beam 50 (FIG. 1) has a front wall 51 with an up flange 57 and a down flange 58 extending above and below top and bottom walls 53 and 54, respectively. The illustrated beam 50 has a cross sectional dimension typical of bumper reinforcement beams, such as about 120 mm high by 40 mm deep (fore-aft dimension when vehicle-mounted), and a length sufficient to extend cross car between vehicle frame rail tips. Wall thickness can be varied as needed for a particular application, but for example can be between about 1/12" to 5/8" (about 2 mm-14 mm). The illustrated fabrics 70-91 include multiple different widths such as 4.75", 7.25", 2.125" and 3.0", and they form many overlapping and laminar arrangements intended to optimize beam properties. It is noted that the laminar arrangement of fabrics 70-90 are compacted and fully coated with polymer during the pultrusion process, with polymeric material being flowed throughout the matrix of fibers. This is accomplished in part by pressure from incoming polymeric material being injected into the injection box, but also by squeezing and potentially vibration as the newly formed beam passes along and out the pultrusion injection die. It is important that all fibers be uniformly and thoroughly infused/coated to achieve optimal bonding and material properties.

In FIG. 8, the force-deflection curves for different beams of similar outer dimensions are shown. Line 121 represents an FD curve for a beam of similar outer dimensions but made of 1500 MPa tensile strength steel material and having front, rear, top, and bottom walls, and having a single internal leg extending between its front and rear walls, and weighing 3.5 g/mm. Line 122 represents the FD curve for a beam made of extruded aluminum having similar outer dimensions, made of 7003 aluminum, having two internal walls, and weighing 2.6 g/mm. Line 123 represents the FD curve for beam made of vinylester and fiberglass reinforcement having similar outer dimensions, made of polyset vinyl-polyester polymer and using continuous fiberglass fabrics/rovings. Line 124 represents the FD curve for a beam 50, made of pultruded polyurethane with embedded carbon fiber mats and tows, relatively close to 60% volume fiber fraction throughout, having two internal walls 55, and weighing 1.9 g/mm.

A comparison of the FD lines (FIG. 8) shows that line 125 (beam 50) has an FD curve basically equal to the lines 120-122 up to about 30 kN at an impact stroke of 22 mm displacement. It is noted that the weight of the beam 50 was 46% less than the weight of the steel beam (see line 121), and was 25% less than the weight of the aluminum beam (see line 122). This is considered to be surprising and unexpected given the similar beam strength.

Figure 5:
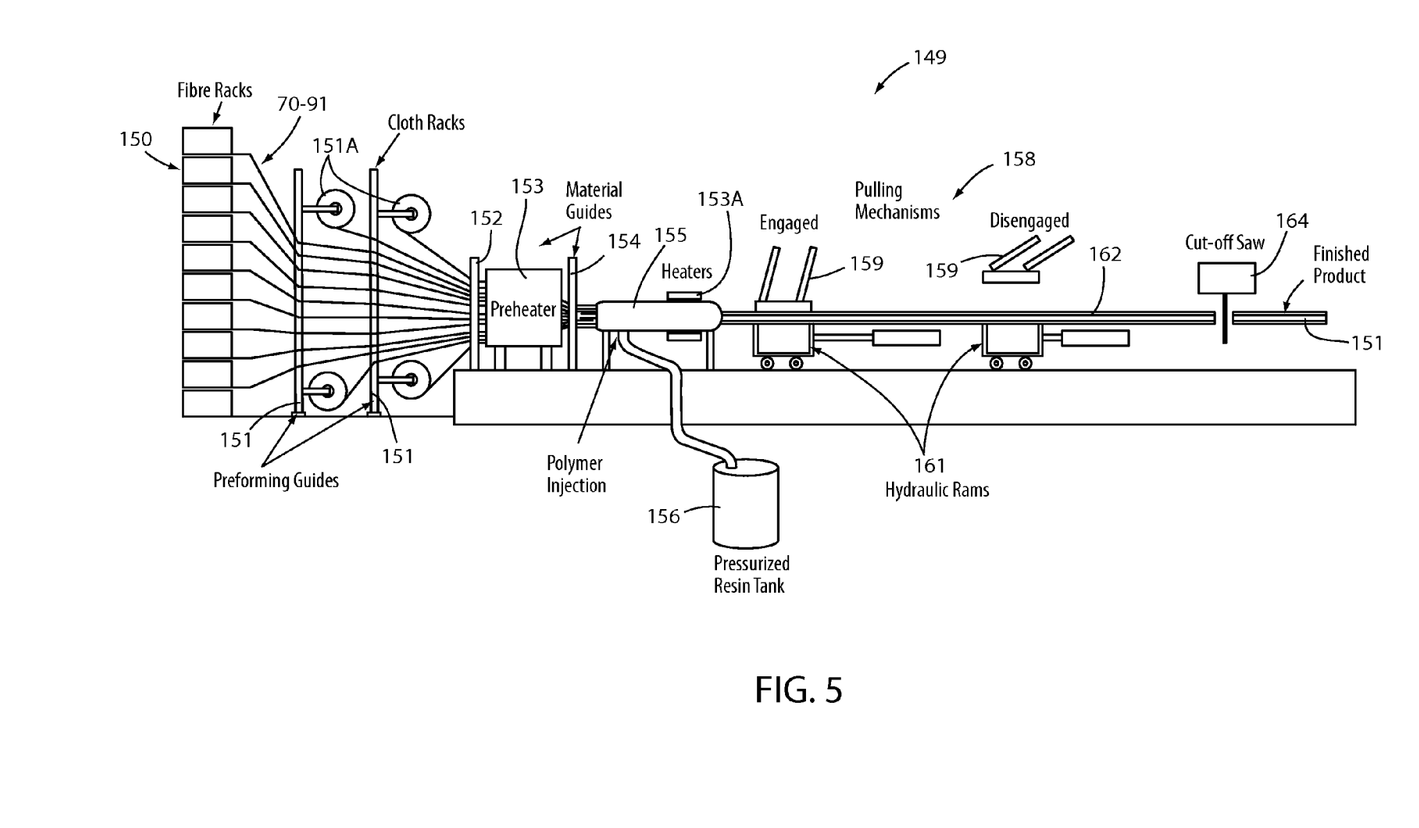
FIG. 5 is a side view of a pultruding apparatus and method for manufacturing the bumper impact beam of FIGS. 1-3.
Figure 9:
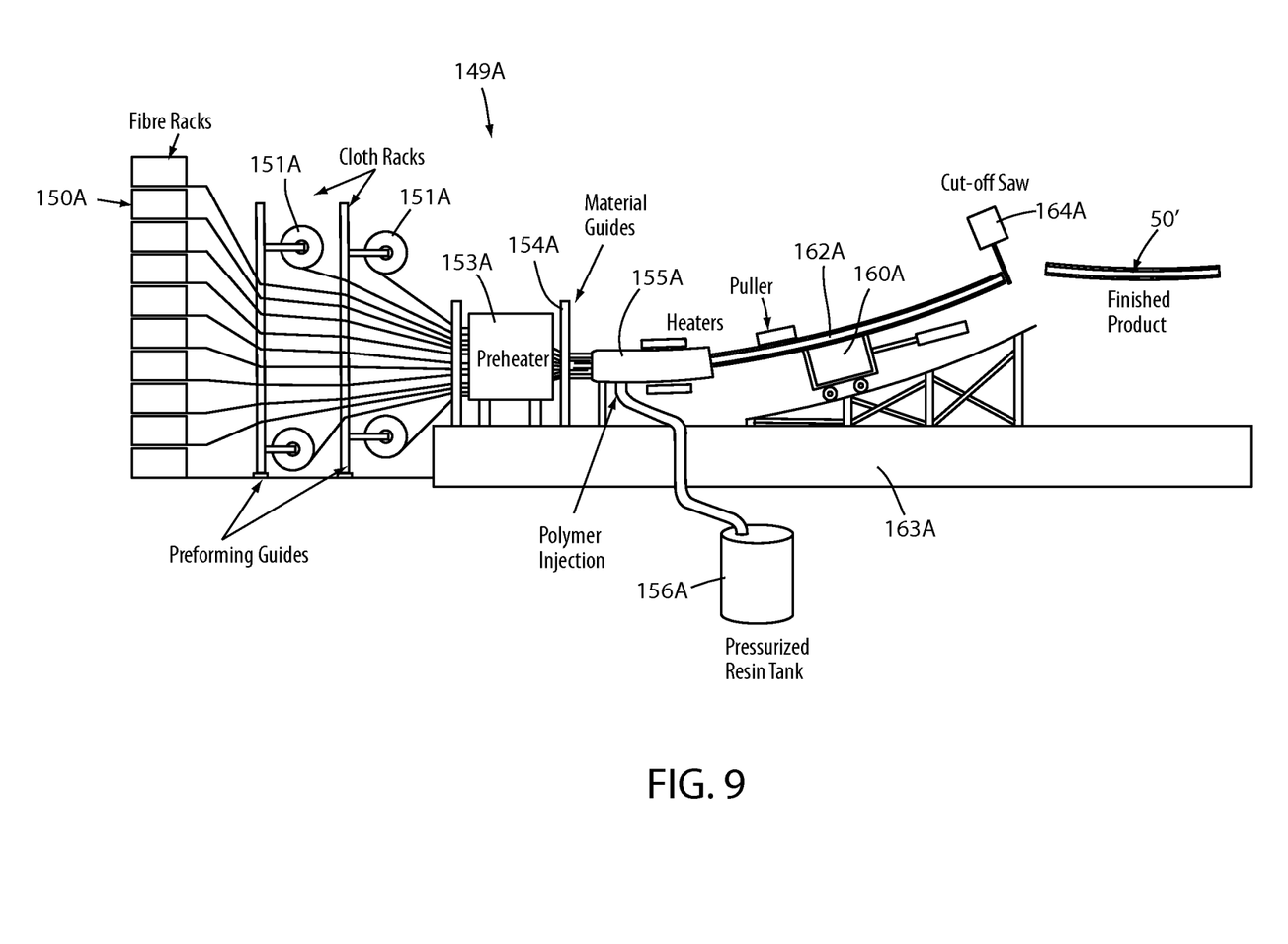
FIG. 9 is a side view of a pultrusion apparatus similar to FIG. 5, but adapted to produce a longitudinally-curved (swept) pultruded beam.

FIG. 9 illustrates a pultrusion process (apparatus 149A) modified to form beams having a non-linear shape, such as a curvilinear swept beam 50'. Similar components to FIG. 5 are identified using the same numbers but with an addition of a letter "A". It is contemplated that the sweeping operation can be performed in-line as shown in FIG. 9, or off-line (prior to the polymer being fully cured, when thermoset polymeric materials are used). The pultrusion equipment for producing a swept beam is basically the same as that shown in FIG. 5, except the injection die 155A is shaped to produce a curved/swept pultruded continuous beam 162A, and the cooling station 163A is modified to provide a curved support for the pultruded continuous beam 162A as it cools and cures. Processes are known for producing a curved pultruded product, such as taught by Harvey U.S. Pat. No. 4,445,957, The teachings of Harvey are incorporated herein for the reader's benefit and for reference.

It is contemplated that a design of the beam can "help" the process for incorporating a sweep into a pultruded beam. For example, beam walls and reinforcements may be designed to cause a sweep as the polymeric material cures, cools, and shrinks. For example, if a front wall of a beam is thicker than a rear wall, the thicker front wall will cool at a different rate and dimensionally shrink a different amount, potentially causing a natural sweep in the beam to occur during final cure and set up of the polymeric material. The reinforcement density and reinforcing fabrics can be varied between different walls to also cause a different dimensional shrink. As illustrated, the downstream sweeping process includes, in significant part, supporting the beam 50' as it naturally curves as the polymer cures and cools. For example, the downstream sweeping mechanism can include a curved portion of the cooling table that is specifically shaped to support the beam as it cools and cures to reach a desired curvature. Also, the pulling mechanism can press the beam 50' against the table during the final cure and cooling process, thus providing more consistent dimensional accuracy to the sweep of the beam 50'. Final curvature of a beam can also be affected by controlling the temperature decline on different sides of the pultruded beam. Thus several things can be done to impart a desired sweep into the beam 50'.

It is to be understood that variations and modifications can be made on the aforementioned structure without departing from the concepts of the present invention, and further it is to be understood that such concepts are intended to be covered by the following claims unless these claims by their language expressly state otherwise.

The embodiments of the invention in which an exclusive property or privilege is claimed are defined as follows:

1. A vehicle bumper system comprising:
    an impact beam including polymeric material and at least 30% by volume of longitudinally-extending continuous fiber reinforcement embedded in the polymeric material, with at least some of the reinforcement extending a length of the beam; and
    attachment structure on ends of the beam for mounting the beam to a vehicle's frame rails;
    wherein the reinforcement includes fabric consisting of a sheet selected from at least one of: woven fabric, stitched fabric, tailored fabric with stitched patterns therein, braided fabrics, and multi-material hybrid fabrics; and
    wherein the fabric includes discontinuous sections strategically placed along and around corners defined by the beam to control crack propagation along the corners upon impact.

2. The bumper system of claim 1, wherein the reinforcement includes at least 40% fiber volume fraction.

3. The bumper system of claim 1, wherein the reinforcement includes at least one fabric extending around a corner formed by a pair of joined walls in the beam.

4. The bumper system of claim 1, wherein the beam includes front and rear walls and also top and bottom and intermediate walls each extending between the front and rear walls.

5. The bumper system of claim 1, wherein the beam is at least 40% polymeric material and at least 40% reinforcement.

6. The bumper system of claim 1, wherein the polymeric material includes at least one of a polyurethane thermoset material, epoxy material, polyester material, and vinylester material.

7. The bumper system of claim 1, wherein the polymeric material and the reinforcement define an overall fiber volume fraction optimization throughout the beam of between 50%-70%.

8. The bumper system of claim 1, wherein the reinforcement includes fibers selected from a group consisting of carbon, aramid, basalt, glass, Spectra™, Diolen™, Sylon™, Dynemma™, boron, ceramic, and natural fibers.

9. The bumper system of claim 1, wherein the attachment structure includes a pattern of holes at ends of the beam.

10. The vehicle bumper system of claim 1, wherein the beam defines a longitudinally curved shape.

11. The vehicle bumper system of claim 1, wherein the beam defines at least one closed section.

12. The vehicle bumper system of claim 1, a vertical cross section thru a front wall comprises planar vertical shape.

13. A bumper impact beam comprising:
    a beam made of polymeric material and reinforcement and including walls defining a cross section having a width (W) and height (H);
    the reinforcement includes at least one first fabric having a first width greater than W but less than H, and at least one second fabric having a second width about equal to H.

14. The bumper impact beam of claim 13, wherein the reinforcement includes at least one third fabric having a third width greater than H but less than or equal to W+2H.

15. The bumper impact beam of claim 13, wherein the beam defines a longitudinally curved shape.

16. The bumper impact beam of claim 13, wherein the beam includes at least one intermediate wall extending from a front wall.

17. The bumper impact beam of claim 13, wherein the first and second fabrics include portions extending around corners defined by the beam.

18. The bumper impact beam of claim 13, wherein the beam includes corners that are T-shaped in vertical cross sections taken through the beam.

19. The bumper impact beam of claim 13, a vertical cross section thru a front wall comprises planar vertical shape.

20. A bumper impact beam, comprising:
    a beam made of polymeric material and reinforcement and, when in a vehicle-mounted position, including front, rear, top and bottom walls defining a cross section having a width (W) and height (H);
    the reinforcement including at least one fabric that extends fully across the front wall and onto the to and bottom walls; and
    wherein the beam includes an intermediate wall extending between the front and rear walls and that is located between the top and bottom walls, and wherein the reinforcement includes at least a second fabric that extends fully across the intermediate wall partially onto at least one of the front and rear walls.

21. The bumper impact beam of claim 20, wherein the beam defines a longitudinally curved shape.

22. The bumper impact beam of claim 20, a vertical cross section thru the front wall comprises planar vertical shape.

23. A bumper impact beam, comprising:
    a beam made of polymeric material and reinforcement and, when in a vehicle-mounted position, including front, rear, top and bottom walls defining a cross section having a width (W) and height (H);
    the reinforcement including at least one fabric that extends fully across the front wall and onto the top and bottom walls; and
    wherein the reinforcement includes a first fabric of first fiber material that extends across the front wall and onto the top and bottom walls, and includes a second fabric of second fiber material that extends across the rear wall and onto the top and bottom walls, the first and second fabrics including overlapping portions on the top wall and also on the bottom wall.

24. The bumper impact beam of claim 23, wherein the beam defines a longitudinally curved shape.

25. The bumper impact beam of claim 23, wherein the beam defines at least one closed section.

26. The bumper impact beam of claim 23, wherein the at least one closed section includes two closed cavities.

27. The bumper impact beam of claim 23, wherein the beam includes at least one intermediate wall extending from the front wall.

28. The bumper impact beam of claim 23, wherein the first and second fabrics include portions extending around corners defined by the beam.

29. The bumper impact beam of claim 23, wherein the beam includes corners that are T-shaped in vertical cross sections taken through the beam.

30. The bumper impact beam of claim 23, a vertical cross section thru the front wall comprises planar vertical shape.

31. A bumper impact beam comprising:
a beam made of polymeric material and elongated reinforcement extending a length of the beam, the beam when in a vehicle-mounted position including front, rear, top, and bottom walls forming a closed section with corners, and at least one internal wall extending between the front and rear walls;
the reinforcement including at least one fabric in each wall that extends a full width of each wall and that extends partially onto an adjacent one of the walls.

32. The bumper impact beam of claim 31, wherein the beam defines a longitudinally curved shape.

33. The bumper impact beam of claim 31, wherein the at least one fabric includes portions extending around corners defined by the beam.

34. The bumper impact beam of claim 31, a vertical cross section thru the front wall comprises planar vertical shape.

35. A bumper impact beam, comprising:
a beam made of polymeric material and reinforcement and, when in a vehicle-mounted position, including front, rear, top and bottom walls defining a tubular cross section having a width (W) and height (H);
the reinforcement including at least one fabric that extends fully across one of the front and rear walls and onto the top and bottom walls; and
wherein the beam includes an intermediate wall extending between the front and rear walls and that is located between the top and bottom walls, and wherein the reinforcement includes at least a second fabric that extends fully across the intermediate wall partially onto at least one of the front and rear walls.

36. A bumper impact beam, comprising:
a beam made of polymeric material and reinforcement and, when in a vehicle-mounted position, including front, rear, top and bottom walls defining a tubular cross section having a width (W) and height (H);
the reinforcement including at least one fabric that extends fully across one of the front and rear walls and onto the top and bottom walls; and
wherein the at least one fabric includes a first fabric of first fiber material that extends across one of the front and rear walls and onto the top and bottom walls and includes at least one second fabric, the first and second fabrics including overlapping edge portions on the top wall and also on the bottom wall.

* * * * *